Jan. 3, 1961     S. A. ZARLING     2,966,979
TRANSISTOR CONTROL SYSTEMS
Filed May 11, 1955     4 Sheets-Sheet 1

INVENTOR
Steve A. Zarling
BY
Harry P. Canfield
ATTORNEY

United States Patent Office 2,966,979
Patented Jan. 3, 1961

2,966,979

TRANSISTOR CONTROL SYSTEMS

Steve A. Zarling, Akron, Ohio, assignor to The Clark Controller Company, Cleveland, Ohio, a corporation of Ohio Filed May 11, 1955, Ser. No. 507,643

9 Claims. (Cl. 192—131)

This invention relates in general to electrically operated control systems for controlling electric current in a work circuit which contains an electrical work device to be energized by the current to activate or operate it, and de-energized to restore it; and relates particularly to such control systems when the work device is of a type that must be activated by abruptly subjecting it to current of a predetermined high amplitude, and restored by abruptly reducing the current to zero, or substantially zero, amplitude.

Control of a work device by current having these characteristics, can be readily effected by prior devices, such as electromagnetic contactors which make and break the current on their contacts; but in many instances such contactors are undesirable, because of high original cost; and because of having mechanically moving parts; and because of being subject to deterioration by wear, and arcing at the contacts, and the consequent necessity of continuous maintenance to insure continuous reliable operation.

According to the present invention the current to the work device is controlled to have the aforesaid characteristics without the disadvantages of magnetic contactors and the like by utilizing transistors.

Transistors, as herein considered are commercial transistors of the junction class, whether of the NPN type or the PNP type. As is well known, such commercial transistors comprise a body of material, electrically of the "semi-conductor" class, having spaced portion designated "emitter" and "collector," and an intermediate portion designated "base." Terminals on the base and emitter provide for connection to a "biasing" circuit; and terminals on the emitter and collector provide for connection to a "main circuit." The operation of such transistors as herein considered, is as follows.

Normally, when the main circuit is subjected to potential the material of the transistor has the property of preventing current flow in the main circuit; and then the device is referred to as in "non-conducting" condition. When the biasing circuit is subjected to potential, current flows in the biasing circuit and this changes the property of the material and causes it to permit current to flow in the main circuit; and the device is then referred to as in "conducting" condition.

By varying the current in the biasing circuit the current in the main circuit may be varied correspondingly. By discontinuing current flow in the biasing circuit, the device is again rendered non-conducting. A small biasing current may in this manner control a larger or amplified main current.

It is known that an electric work device connected in the main circuit of such a transistor can be activated to operate it by energizing the biasing circuit of the transistor; and can be maintained operated by maintaining the bias energization; and can be de-energized to restore it by de-energizing the biasing circuit; and that the control of the biasing circuit can be effected by simply closing and opening the contacts of a control contactor in the biasing circuit.

The present invention has been made for fields of use in which the aforesaid simple manner of using a transistor and a control contactor to operate and restore a work device is not sufficient. These fields of use require the following mode of operation.

(a) The transistor must be biased to conducting condition upon closing the contacts of a control contactor;

(b) It must remain in biased conducting condition when the said control contacts are subsequently opened;

(c) The contacts of another control contactor must be opened to remove the bias and render the transistor non-conducting;

(d) It must remain unbiased and non-conducting when the contacts of the said other control contactor are subsequently closed.

(e) The work device as will be understood will be energized and de-energized when the transistor is in conducting and non-conducting condition, respectively.

The improved control hereof utilizing transistors, for energizing and de-energizing a work device in an electric work circuit, may be used to advantage in various arts.

As an illustrative example of its practical uses, it has been chosen to describe it herein as applied to power operated electrically controlled reciprocatory presses.

This choice has been made because controls for such presses comprise a work device in an electric work circuit which in accordance with the general purposes of the invention, is energized and de-energized, respectively, to start and stop the press; and also because such press controls comprise a multiplicity of magnetic contactors; and circuits, auxiliary contacts, electric interlock maintaining circuits, etc. for the contactors; all deemed necessary today for purposes of safety to the press operators and to protect the press and the work therein from damage due to faulty operation; and these complications of moving parts and contacts can be obviated by the use of transistors, and enormous simplification and improvement effected thereby, whereby the advantages of the invention are evidenced; and because the field of press controls is one of the fields referred to generally hereinbefore in which a transistor, used for energizing and de-energizing a work device, must have the particular kind of control by control contacts specifically set forth above, at (a) to (e).

In attempting to eliminate the complications of a press control of the magnetic contactor type by the use of transistors, problems arise the solution of which is not obvious.

In order that said problems may be fully understood, it is in order to outline briefly herein the features of an electric press control, of the magnetic contactor type.

A continuously running electric motor is connected to the press, to operate it, by a clutch; and the press is stopped by a brake. When one goes on, the other goes off, and vice versa, and this is effected by a fluid pressure cylinder and piston device. Fluid pressure, usually air pressure, is admitted to and exhausted from the cylinder by an electromagnetic valve device. The winding of the valve device is thus the work circuit device, of the premises, to be energized by suitably large current to operate it, and cut off or de-energized, to restore it.

Operation of the valve causes the brake to release and the clutch to set to start the press, and restoring of the valve causes the clutch to release and the brake to set to stop the press.

Operator's control push buttons are provided in a plurality of pairs, a pair for both hands of each of a plurality of operators; and only when all of the push buttons are closed, can the magnetic contactors cause the valve winding to be energized and the valve operated; and the push buttons are located remotely from the press to compel the operators to take up positions of safety.

The press operations are controlled cyclically by cam switches on the press main shaft.

These cam switches are timed to operate at certain points in the 360° complete cycle of the press, that is, a complete revolution of the press main shaft; and the operations of the cam switches are coordinated with the operations of the magnetic contactors by the push buttons, for purposes of safety to the operators.

To this end the push buttons must all be depressed to start the press, and all held depressed until the press has made about one half of its cycle. If any one is earlier released the press will stop. After the half cycle they can all be released and the press will continue on the second half of its cycle. At the completion of the cycle, the press will stop.

If however the push buttons or any one of them has not been released the press will not start again and repeat the cycle, and cannot be started again on another cycle until all of the push buttons have first been fully released and all of them depressed again.

The invention in its broad aspects comprises an electric control for energizing and de-energizing an electric work device in an electric work circuit, having improvements resulting from utilizing transistors to control the current in the work circuit.

In another aspect the invention comprises an improved press control having the above outlined features and mode of operation now available in press controls of the magnetic contactor type, but which by utilizing transistors, effects great simplification and reduces initial and maintenance costs.

In another aspect the invention comprises an improved control for transistors by control contactors, adapted for use in press controls, but applicable to uses in other arts.

The invention is fully disclosed in the following description taken in connection with the accompanying drawing in which.

Figure 1:
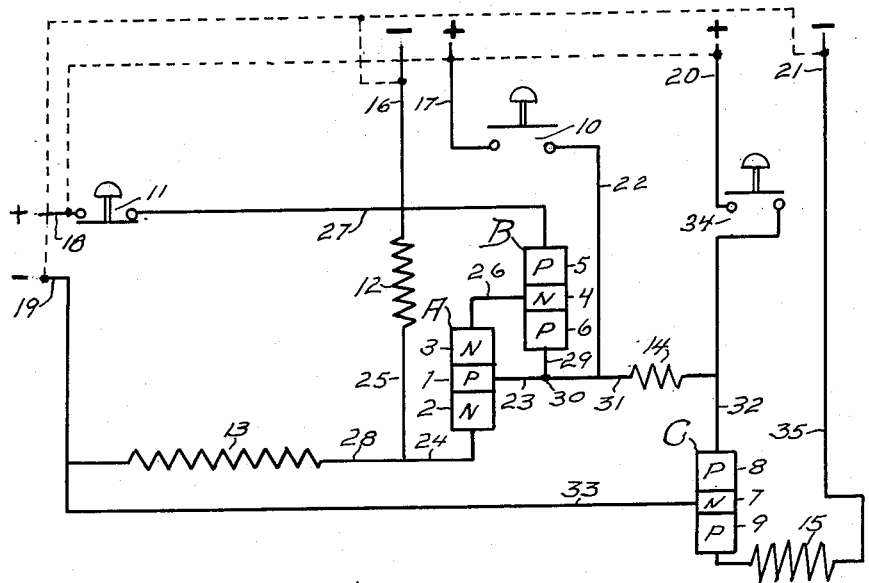
Fig. 1 is a diagrammatic view of an electric system illustrating the control of the conductivity of a transistor according to certain particular requirements, and constituting part of the invention.

In the drawing, Fig. 1 illustrates a control system for a transistor having the particular mode of operation identified at (a) to (e) hereinbefore, which, as a part of the invention hereof, adapts the transistor to particular fields of use.

At A is a junction transistor of the NPN type comprising a base 1, an emitter 2, and a collector 3.

At B is a junction transistor of the PNP type comprising a base 4, an emitter 5 and a collector 6.

At C is a junction transistor of the PNP type comprising a base 7, an emitter 8 and a collector 9.

At 10 is a normally open control contactor of the push button type.

At 11 is a normally closed control contactor of the push button type.

At 12, 13 and 14 are resistance units.

At 15 is an electric load device.

At 16—17 and 18—19 and 20—21, are positive and negative unidirectional current supply mains.

Other parts will be described as the following description of operation proceeds.

Upon closing the control contactor 10, a circuit is completed from positive main 17, through contactor 10, wires 22 and 23, to the base 1 of transistor A, and from its emitter 2, by wires 24 and 25 and through resistor 12, to negative main 16.

According to the principles of NPN junction transistors, this circuit constitutes the biasing circuit of transistor A, and current flows therein of selected value determined by the resistor 12, and puts the transistor A in conducting condition, so that current may flow in its main circuit comprising a wire 26 connected to the collector 3, and the wire 24 connected to the emitter 2.

The transistor B of the PNP type, has a biasing circuit from the positive main 18 through contactor 11, by wire 27 connected to emitter 5 and from base 4 by said wire 26; and transistor A, now being in conducting condition, current flows in this biasing circuit of transistor B and in the main circuit 26—24 of transistor A and by wire 28 and resistor 13 to negative main 19.

The biasing circuit of transistor B being thus energized, transistor B is put in conducting condition so that current may flow in its main circuit comprising wire 27 connected to the emitter 5 and a wire 29 connected to the collector 6; and current flows in this main circuit and by wire 23 to base 1 and from emitter 2 of transistor A and by wires 24 and 28 to main 19.

Thus, the main circuit of transistor B maintains energization of the biasing circuit of transistor A, and the main circuit of transistor A maintains energization of the biasing circuit of transistor B; and both transistors A and B maintain each other in conducting condition, and with current flowing through them, from main 18 to main 19, through the control contactor 11 and the resistor 13.

The transistor C of the PNP type has a biasing circuit branching from the main circuit of the transistor B at a point 30 and comprising a wire 31, resistor 14, wire 32 connected to the emitter 8, and a wire 33 from the base 7 to the main 19. Current flows in this circuit and renders the transistor C conducting.

As will be noted, energization of the biasing circuit of transistor C depends upon the described maintaining function of the transistors A and B which in turn depends upon the closed condition of control contactor 11.

The control contactor 10 may therefore be opened and transistor C will remain biased and in conducting condition so long as control contactor 11 remains closed.

Upon opening control contactor 11, the biasing circuit 27—26 of transistor B is opened; and transistor B becomes non-conducting, and ceases to energize the biasing circuits 23—24 and 32—33 of transistors A and C and they become non-conducting.

Closing the control contactor 11 will now be without effect because the biasing circuits of all of the transistors A, B and C are de-energized and remain de-energized once the contactor 11 is opened.

In order to again bias the transistor C to put it in conducting condition the control contactor 11 must be closed; and the control contactor 10 must also be closed at least momentarily.

The transistor C has a main circuit from positive main 20 through a contactor 34 by wire 32 to emitter 8 and from collector 9 through the load device 15, thence by wire 35 to negative main 21.

When the transistor C has been put in conducting condition as described, by closing contactor 11, and closing, or, closing and opening contactor 10, device 15 may be energized and de-energized by closing and opening the contactor 34.

If the contactor 34 is not provided or if provided is maintained closed, them with contactor 10 closed, the load device 15 will be energized when contactor 11 closes; will remain energized when contactor 10 is opened; and can only be de-energized by opening contactor 11; and then will not be energized again by closing contactor 11 alone, but only by also closing contactor 10.

In Fig. 1, three sources of unidirectional current 16—17, 18—19 and 20—21, have been shown, but a single source may be used as indicated in dotted lines.

Thus the operative principles of the system of Fig. 1 fulfill the requirements of certain fields of use set forth at (a) to (e) hereinbefore.

The field of press control is one of said fields, and a press control system will now be described, embodying the invention and embodying as a part thereof the operative principles of Fig. 1.

Figure 2:
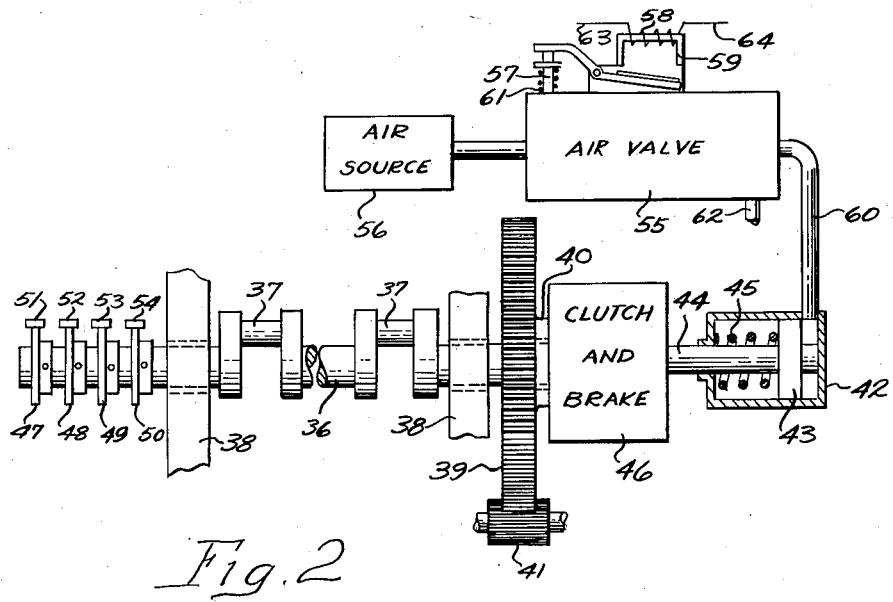
Fig. 2 is a view illustrating in simplified form a part of a power press, comprising a single air valve and a single electromagnetic winding; to the control of which the invention is particularly applicable.

Reference is first made to Fig. 2 which illustrates part of a press mechanism.

The main shaft 36 of the press is provided with cranks 37 to reciprocate the press head, in a well known manner, and is rotatably supported in bearings on the main frame 38; and has a gear 39 with a hub 40, normally rotated idly on the shaft by a motor pinion 41.

A pneumatic cylinder 42 supported on the main frame of the press has a piston 43 therein with a piston rod 44 projecting therefrom. The piston is normally retracted by a spring 45.

The gear hub 40 and piston rod 44 project into a clutch and brake mechanism indicated diagrammatically at 46. The mechanism comprises elements by which when the piston 43 is retracted by the spring 45, a brake grips the shaft 36 and stops the press; and by which when the piston rod is projected forwardly, by fluid pressure behind it, the brake is released and the hub 40 is connected to the shaft 36 by a clutch, to cause the gear to drive the shaft and the press; the clutch being released when the piston rod 44 is retracted.

On the free end of the press shaft 36 are mounted cams 47 to 50 that rotate with the shaft and operate cam switches 51 to 54 to open and close them; and the cams are adjustable around the shaft to cause them to operate the switches at selected points in the press cycle.

An air valve housing 55 communicates with a source 56 of air under pressure. Within the housing 55 is a main valve not shown, controlled by a reciprocable pilot valve indicated at 57. The pilot valve is reciprocated to an operated position upon energization of the winding 58 of an electromagnet 59 and then the main valve is operated by air pressure and effects communication of air pressure through a conduit 60 to the cylinder 42 to move the piston 43 and rod 44 forwardly to operate the clutch and brake mechanism 46 to start the press. When the winding 58 is de-energized, a spring 61 restores the pilot valve 57 and then the main valve is restored and cuts off communication of pressure to the conduit 60 and opens an exhaust conduit 62; and the cylinder spring 45 returns the piston rod 44 and operates the clutch and brake mechanism 46 to release the clutch and set the brake to stop the press.

Part of the energizing circuit for the winding 58 is shown at 63—64.

The air valve described above, operating responsive to energization and de-energization of a winding, and shown diagrammatically in Fig. 2 may be that constituting the subject matter of copending application of Jan R. Ohllson Serial Number 417,795, filed March 22, 1954, and now Patent Number 2,902,052 issued on September 1, 1959, to which reference may be made for structural details.

Figure 3:
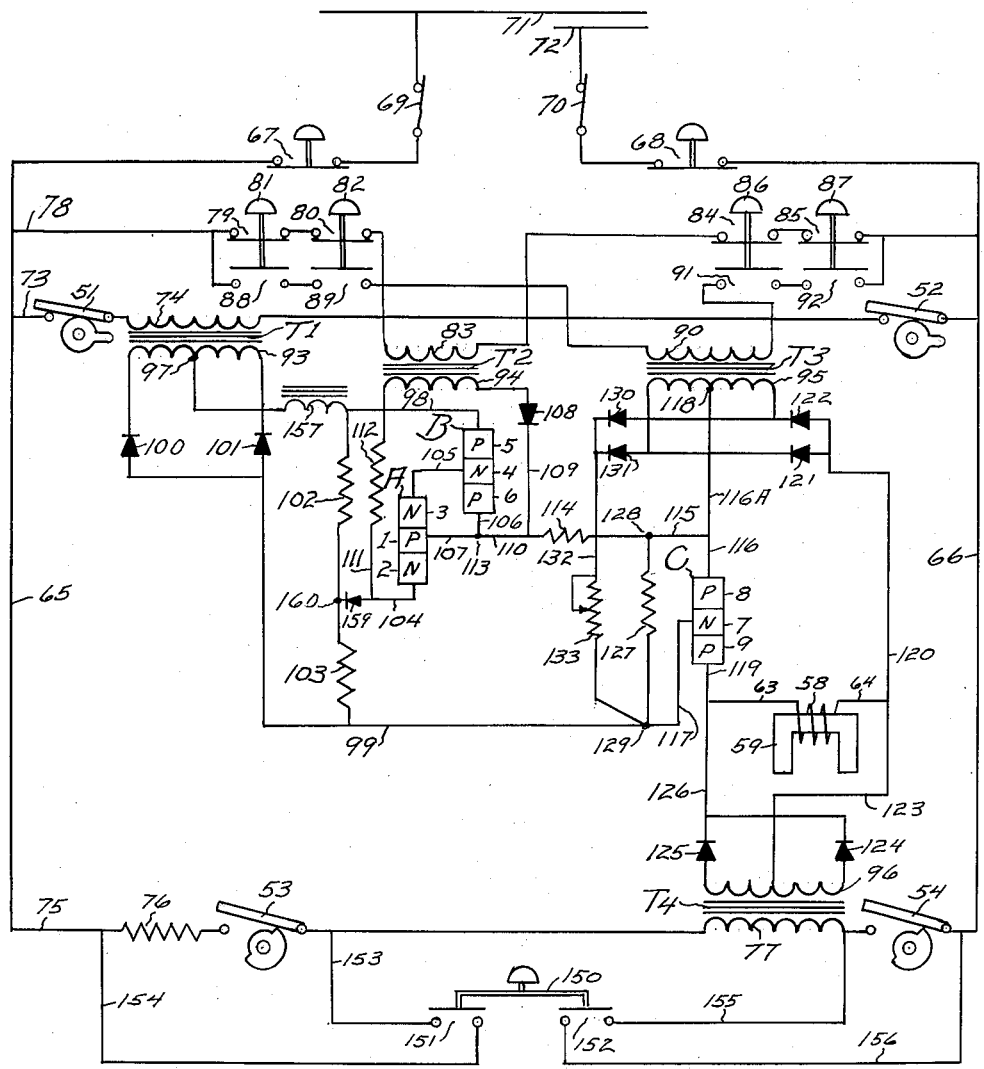
Fig. 3 is a diagrammatic view illustrating the application of the invention to the control of a press of the type indicated in Fig. 2.

In Fig. 3 which illustrates the invention as applied to press controls, the aforesaid cam operated switches 51 to 54, the electromagnet 59 and its winding 58 and energizing circuit 63—64, are reproduced from Fig. 2 with the same reference numerals.

Fig. 3, is in the form of an across-the-line diagram comprising side lines 65 and 66 connected at their upper ends through "stop" contactors 67 and 68 and disconnecting switches 69 and 70 to A.C. supply mains 71 and 72.

A cross line 73 contains in series the cam operated switch 51, the primary 74 of a transformer T1, and the cam operated switch 52.

A cross line 75 contains a series a resistor 76, the cam operated switch 53, the primary 77 of a transformer T4, and the cam operated switch 54.

A cross line 78 is connected through normally closed upper contacts 79 and 80 of a pair of push button contactors 81—82 and through the primary 83 of a transformer T2, and through normally closed upper contacts 84 and 85 of another pair of push button contactors 86 and 87.

The cross line 78 is also connected through normally open lower contacts 88 and 89 of the push button contactors 81 and 82 and through the primary 90 of a transformer T3 and through normally open lower contacts 91 and 92 of the push button contactors 86 and 87.

As will be apparent from the drawing, when all of the push button contactors 81—82—86—87 are in their "up" positions, and only then, the transformer T2 will be energized; and when all of the push button contactors are in their "down" positions, and only then, the transformer T3 will be energized.

The transformers T1, T2, T3, T4 have, respectively, secondaries 93, 94, 95 and 96.

At A is an NPN junction transistor comprising a base 1 an emitter 2 and a collector 3; at B is a PNP junction transistor comprising a base 4, an emitter 5 and a collector 6; and at C is a PNP junction transistor comprising a base 7, an emitter 8, and a collector 9.

These transistors are reproduced from Fig. 1 with the same reference numerals, to indicate their identity of function in the two figures.

Other parts of Fig. 3 not described above will be described in the following description of operation.

It will be assumed that the press is at rest, with its reciprocatory press parts at the top of the stroke. Cam switches 51—52 are set to open and close again, at about 270 degrees of the press stroke and therefore are closed at this time. Cam switches 53—54 are set to close at 180° of the stroke, and to open at 360° of the stroke, and therefore are open at this time.

Under normal and intended conditions the push button contactors 81—82—86—87 are all released and are in their normal up positions.

Assuming that line switches 69—70 normally remain closed, the control system of Fig. 3 goes at this time into make-ready condition, as follows, ready for the press cycle to be started by the operators.

Transformer T1 is energized through closed cam switches 51—52.

Its secondary 93 has a mid point 97 connected to an upper line 98. A lower line 99 is connected through linear rectifiers 100 and 101 to the ends of the secondary 93; and resistors 102 and 103 bridge the lines 98 and 99.

Full wave rectified unidirectional positive potential appears on the line 98 and drops through the resistors 102 and 103 to negative potential on the line 99.

A line 104 is connected to a point 160 between the resistors 102 and 103 and the drop of potential in the resistor 102 is impressed on the lines 98 and 104; and the transistors A and B are connected between the lines 98—104 as follows, and subjected to this potential.

The positive line 98 is connected to the emitter 5 of transistor B. The base 4 of transistor B is connected by a wire 105 to the collector 3 of transistor A. The collector 6 of transistor B is connected to the base 1 of transistor A by wires 106 and 107. The emitter 2 of transistor A is connected to the line 104 and point 160.

As more fully described for Fig. 1, the NPN transistor A has a biasing circuit, in at the base 1 and out at the emitter 2; and has a main circuit, in at the collector 3 and out at the emitter 2.

The PNP transistor B has a biasing circuit in at the emitter 5 and out at the base 4; and has a main circuit in at the emitter 5 and out at the collector 6.

In the absence of other provisions the potential of lines 98 and 104 would not cause flow of current in the transistors because both transistors are in non-conducting condition.

However, at this time, and as intended in normal operation, the push button contactors 81—82—86—87 are all released and in their up positions. Current flows in cross line 78 through contacts 79—80—84—85 and primary 83 of transformer T2, energizing secondary 94.

Current then flows in a local circuit from one end of the secondary 94 through a linear rectifier 108, wires 109, 110, 107 to base 1 and from emitter 2 of transistor A, to line 104 and by wire 111 through a current limiting resistor 112 back to the secondary 94. This is the biasing circuit for the transistor A and puts transistor A in conducting condition.

The biasing circuit for transistor B is from line 98, to emitter 5 and from base 4 to wire 105, and through transistor A now in conducting condition, to line 104, and the potential of lines 98—104 causes current to flow in this biasing circuit it puts transistor B in conducting condition.

Current then flows from line 98 through transistor B and by wires 106—107 to base 1 and from emitter 2 of transistor A, to line 104.

As will be seen (and as described also for Fig. 1) current in the main circuit of transistor B, maintains energization of the biasing circuit of transistor A, and the main circuit of transistor A maintains energization of the biasing circuit of transistor B; and both transistors A and B maintain each other in conducting condition.

The main current through transistor B divides at a point 113 part going by wire 107 as described, and part going through a circuit comprising wire 110, a resistor 114, wires 115 and 116, the emitter 8, and base 7 of transistor C and by wire 117 to said lower line 99. This is the biasing circuit of the transistor C and puts the transistor C in conducting condition. The proportional division of current at the point 113, is determined by the selected value of the resistor 114, to cause enough current to flow in the circuit 107—104 to maintain the transistor A in a stable conducting condition, uninfluenced by fluctuations of energizing potential that might occur; and to keep the biasing circuit 116—117 of the transistor C energized sufficiently so that ample current will flow in its main circuit when the latter is closed.

The foregoing succession or series of make-ready events, occur in a very short period of time.

The operators may now start the press cycle by depressing the push button contactors 81 etc., closing contacts 88 etc. and energizing transformer T3.

As described for Fig. 2 the press starts upon energizing the winding 58 of the magnet of the air valve. In Fig. 3, the winding 58 is reproduced and energized as follows from the secondary 95 of transformer T3.

The secondary 95 has a mid point 118 connected in a circuit comprising the wire 116, the emitter 8 and collector 9 of transistor C, a wire 119, the wire 63, the valve winding 58, the wire 64, and a wire 120 going to the ends of the secondary 95 through linear rectifiers 121 and 122.

This circuit is the main circuit of the transistor C and, since the transistor is in conducting condition, full wave rectified unidirectional current flows in the valve winding 58; and, as described for Fig. 2, the press starts its cycle.

For safety, the operators are required to keep their hands occupied and out of danger by holding the push button contactors down until the reciprocating parts of the press have reached approximately the bottom of the stroke, or 180 degrees of the cycle.

If any one push button contactor is released it will de-energize transformer T3 and de-energize the valve winding 58, and the press will be stopped as described for Fig. 2.

At about 180 degrees of the cycle the cam switches 53—54 close, energizing transformer T4. Its secondary 96 has a mid point connection to the valve winding wire 64 by wire 123; and the ends of the secondary are connected through linear rectifiers 124—125 to the valve winding wire 63 by a wire 126. The winding 58 is accordingly energized by full wave rectified potential from the transformer T4 concurrently with like energization from the transformer T3 as described, when the cam switches 53—54 close at 180 degrees of the cycle.

The energization of the valve winding 58 by the transformer T4 is preferably made of small value by the resistor 76 in series with the transformer primary 77; and is sufficient to hold the magnet 59 operated, as described for Fig. 2, once it has been operated by energization through the transistor C as described, but not sufficient to operate it in the first instance.

When the press has started on the second half of its cycle and danger to the operators may be presumed to have passed, the operators, in the intended manner of operating the press, will release the push button contactors 81 etc., to return to their up positions. This de-energizes transformer T3 and terminates energization of the valve winding 58 through the transistor C, and it is then maintained energized by the transformer T4 as described.

When the press has completed its cycle, at 360 degrees, the cam switches 53—54 open and de-energize transformer T4, which deenergizes the winding 58, and the press will be stopped as described for Fig. 2.

Safety provision is made to insure that the press will be stopped at the end of the cycle and not start another cycle, or repeat cycle after cycle, even if the operators should, by abnormal operation, continue to hold the push button contactors 81 etc. in their down positions, thereby keeping the transformer T3 energized; and to this end the operators are compelled to release all of the push button contactors and close all of the up contacts 79 etc., preliminary to starting another cycle. This provision is as follows.

Shortly before the cycle is completed, say at 270 degrees, the cam switches 51—52 open momentarily and then close again.

When the cam switches 51—52 open, they deenergize transformer T1 and the potential across lines 98—104 disappears, and the transistors A and B, which were maintained conducting by this potential, cease to be conducting; and discontinue energization of the biasing circuit of the transistor C so that it ceases to be conducting.

When the cam switches 51—52 reclose after their said momentary opening, the transformer T1 is again energized, and restores the potential on the lines 98—104 but the transistors A and B remain non-conducting and keep the transistor C non-conducting, because as has been described, to render the transistors A and B conducting, transformer T2 must be energized through the push button up contacts 79 etc. and they are now open because the push button contactors are being held in their down positions.

Therefore if the operators fail to release the push button contactors 81 etc. as referred to, they may keep the transformer T3 energized, but the transistor C is made non-conducting, and the valve winding 58 cannot be energized through it, but continues to be held energized by the transformer T4, and therefore subject to being de-energized to stop the press by the cam switches 53—54 at the end of the cycle.

If the operators, by normal operation, release the push button contactors at about the half cycle as referred to, and therefore close the push button up contacts 79 etc. then, when the cam switches 51—52 open, the transistor C becomes non-conducting, and when the cam switches 51—52 close again, the transistor C again becomes conducting.

Thus with the cam switches 51—52 closed, the transistor C becomes conducting upon closing up contacts 79 etc.; and remains conducting when up contacts are opened; so that contacts 79 etc. may be closed momentarily; and becomes non-conducting when cam switches 51—52 open; and remains non-conducting when switches 51—52 close again; and can only be made conducting again by closing up contacts 79 etc.

Fig. 3 will thus be seen to embody the principles described separately for Fig. 1.

When the push button contactors 81 etc. are by abnormal operation held down, and not released during the latter half or part of the cycle, they maintain transformer T3 energized; and if transistor C were conducting at the time, the valve winding 58 would be energized and keep the press operating cycle after cycle repeatedly; and for safety this must be avoided.

Opening of cam switches 51—52 renders transistor C non-conducting by de-energizing transformer T1 and rendering transistor B non-conducting and thereby de-energizing the biasing circuit of transistor C as described.

When the cam switches 51—52 close again and energize transformer T1, a current path can be traced from positive line 98 through the main circuit of transistor B, wires 106, 110, 115, 116 through biasing circuit of transistor C by wire 117 to negative line 99.

There may be instances in which current will flow in this path. In general this current will be very small because the biasing circuit of transistor B is not energized, and it is non-conducting, and is of high resistance; and such very small current in the biasing circuit of transistor C would have negligible effect.

However, some abnormal circumstance or condition might cause this current to have a value too near that which makes transistor C fully conducting, to be safe, at times when the push button contactors are held down by abnormal operation, as here considered.

In any event, it is undesirable for current to flow in this said path except when it is current intended to render the transistor C conducting.

To guard against such contingency, provision is made as follows.

A resistor 127, is connected at one end to a point 128 on the conductor 115, and at its other end to a point 129 on the conductor 117.

The point 128 is connected by wires 115 and 116A to the mid point 118 of the secondary 95 of transformer T3; and the ends of the secondary 95 are connected through linear rectifiers 130—131 to a wire 132, and thence through an adjustable resistor 133 to the point 129.

A local circuit is thus provided, from point 128 by wires 115 and 116A to point 118 and thence to point 129 and back to point 128; and unidirectional rectified potential from the transformer T3 is in series with this local circuit, causing current to flow in the direction from conductor 115 through conductor 116A.

The said unwanted current tends to flow from conductor 115 through conductor 116 but because of the electromotive force in the said local circuit, current in conductor 115 is diverted from conductor 116 and caused to flow in conductor 116A.

The unwanted current thus diverted into the local circuit is small as referred to and a correspondingly high value for the resistor 133 may be provided without causing loss of potential therein by the current.

When in normal operation, the down position of the push button contactors energizes the transformer T3 at a time when the transistor C is being rendered conducting by large wanted current flowing in conductor 115 to conductor 116, only a small portion thereof will be diverted into said local circuit by way of conductor 116A because any considerable diverted current would cause the loss of potential in the resistor 133 to neutralize the diverting effect of the local circuit.

There are circumstances in which, in the absence of countervailing provisions, current might flow in the valve winding 58 when not wanted and for an indefinite time.

For example, potential on the side lines 65—66 may fail; or may be cut off intentionally by opening one of the stop contactors 67—68; and the valve winding 58 will thereby be de-energized and the press will be stopped as described for Fig. 2.

This might occur at a time when the cam switches 53—54 are closed.

When potential is again restored to lines 65—66, the transformer T4 will be energized and the winding 58 will receive current from the secondary 96; and even if it be current of small holding value due to resistor 76 as referred to, it is undesirable to have the winding 58 continuously energized in this manner.

Figure 4:
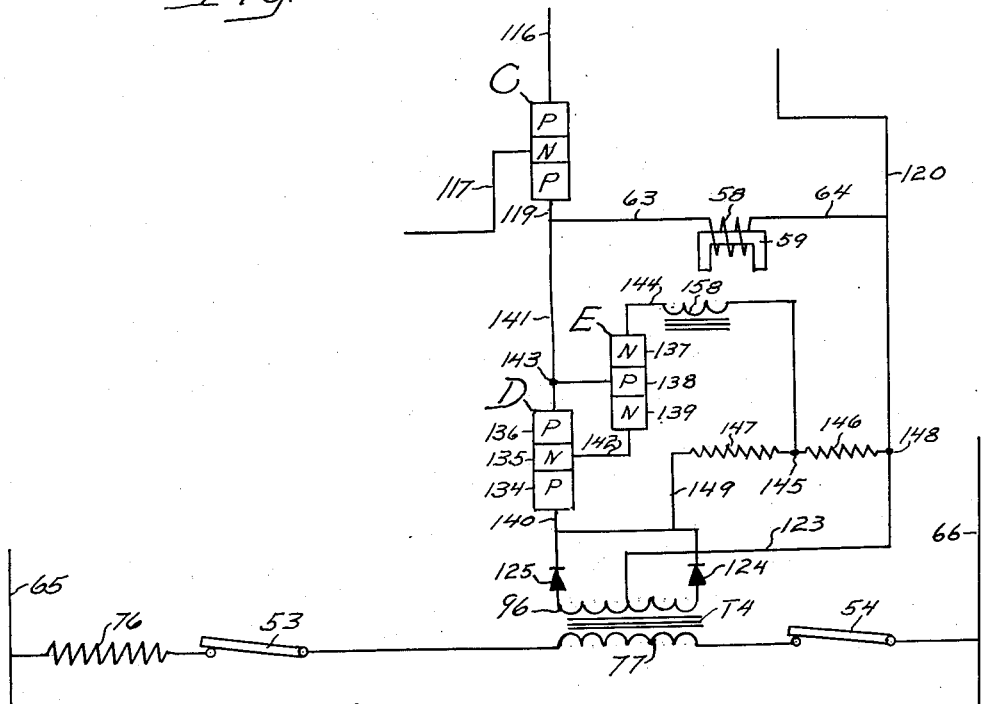
Fig. 4 is a view illustrating a modification of Fig. 3.

To prevent this, the following means may be provided, as a modification of Fig. 3 and illustrated in Fig. 4 wherein pertinent parts of Fig. 3 have been reproduced. At D is a transistor of the PNP type comprising an emitter 134, a base 135 and a collector 136.

At E is a transistor of the NPN type having an emitter 137, a base 138 and a collector 139.

The main circuit of the transistor D is in the line of wires 140 and 141.

In the normal operation of the system, as described for Fig. 3, the valve winding 58 is first energized by the operator through the transistor C in the circuit 119, 63, 58, 64, 120. If at this time transformer T4 is being energized through the cam switches 53—54, then in a manner to be described, the transformer will render transistor D conducting and maintain it conducting, and the winding 58 will be concurrently energized from the transformer secondary 96 by the circuit 140, transistor D, 141, 63, 58, 64, 123.

When energization of the winding 58 through the transistor C is terminated by the operator (as described for Fig. 3) its energization will be maintained by the transformer T4 until the cam switches 53—54 open, because transistor D is maintained conducting by the transformer T4, as will be described.

If however, as in the illustrative example above mentioned, the transformer T4 should become energized at a time when the winding 58 is not being energized by the operators through transistor C, then the transistor D will not be conducting and the resistance of its main circuit will prevent flow of unwanted current to the valve winding 58, in the line 140—141.

Transistor D is rendered conducting and non-conducting for the purposes described, as follows.

The base 135 of transistor D and the collector 139 of transistor E are connected by a wire 142.

The base 138 of transistor E is connected to the collector 136 of transistor D by being connected to a point 143 on the wire 141.

The emitter 137 of transistor E is connected by a wire 144 to a point 145 between two resistors 146 and 147. The end of the resistor 146 is connected to a point 148 on the wire 123 and thus to the mid point of the transformer secondary 96. The end of resistor 147 is connected by wire 149 to the ends of the secondary 96 through the rectifiers 124—125.

When valve winding 58 is being energized through transistor C as referred to, positive potential appears at the point 143 and negative at the point 148, and current flows from point 143 to base 138 and from emitter 137 of transistor E, that is, in the biasing circuit of the transistor E; and thence to point 145 and through resistor 146 to point 148.

This energizes the biasing circuit of transistor E and renders the transistor E conducting.

If transformer T4 is now being energized, current flows from its secondary 96 by wire 140 to emitter 134 and from base 135 of transistor D, that is, in the biasing circuit of transistor D, and thence by wire 142 to transistor E and through its main circuit to wire 144 and point 145 and through resistor 146 to point 148.

This energizes the biasing circuit of transistor D and renders it conducting and current flows from secondary 96 through the main circuit of transistor D and to the valve winding 58 over the circuit 140, D, 141, 63, 58, 64, 123.

Transistor E is now maintained conducting by current through the transistor D and through the biasing circuit of transistor E; and transistor D is maintained conducting by current through the biasing circuit of transistor D and through the main circuit of transistor E.

When transistors D and E have once been made conducting they maintain each other conducting, by transformer secondary current.

Transistor D being maintained conducting, the valve winding 58 will continue to be energized by the transformer T4 through the transistor D until cam switches 53—54 open and de-energize the transformer.

If however as in the above mentioned example, potential comes on the transformer T4 at a time when the winding 58 is not being energized, said positive potential at the point 143 will be absent, and the sequence of events that renders the transistor D conducting cannot take place; and transistor D acts as high resistance preventing transformer current from going to the valve winding.

In press controls generally, provision is usually made for starting and stopping the press to give it "inching" movement.

In Fig. 3 inching is effected by a control contactor 150 of the push button type having normally open contacts 151 and 152.

Upon depressing the contactor 150, the contacts 151 close a circuit through wires 153—154, bridging the resistor 76 and cam switch 53; and the contacts 152 close a circuit through wires 155—156, bridging cam switch 54.

The transformer T4 is thereby energized, and its secondary 96 energizes the winding 58 to operate the press, so long as the contactor 150 is held down.

In Fig. 3, transistors A and B are rendered conducting by flow of current in their biasing circuits, and to maintain them continuously conducting for the purposes described the current must not be interrupted; but the current is rectified alternating current waves in the wire 98 and tends to fall to zero and be interrupted at the end of each half cycle. To insure against interruption, an inductive reactance 157 is placed in the line of the wire 98 which charges magnetically during each half wave, and discharges at the end of the half wave and thereby holds the current above zero value until after the next half wave has started, thus preventing interruption of the current flow.

In Fig. 4, a similar reactance 158 is placed in the line of wire 144 to similarly prevent interruption of the biasing current of transistors E and D.

In the foregoing, as an illustrative use of the invention, it is described as applied to press controls in which the press is started and stopped by the energization and de-energization of a winding which controls operations of an air valve structure; diagrammatically represented in Fig. 2; and reference is made to the copending patent application, Serial Number 417,795, filed May 22, 1954 and now Patent Number 2,902,052 issued on September 1, 1959, by Jan R. Ohllson as disclosing a winding-controlled air valve structure suitable for the purpose.

In the copending patent application Serial Number 490,080 filed February 23, 1955 and now Patent Number 2,907,193 issued on October 20, 1959, by Robert H. Hoge is disclosed an air valve structure suitable for press control purposes, having improved safety features. The general arrangement is shown diagrammatically in Fig. 5, and details can be found in said Hoge application.

Figure 5:
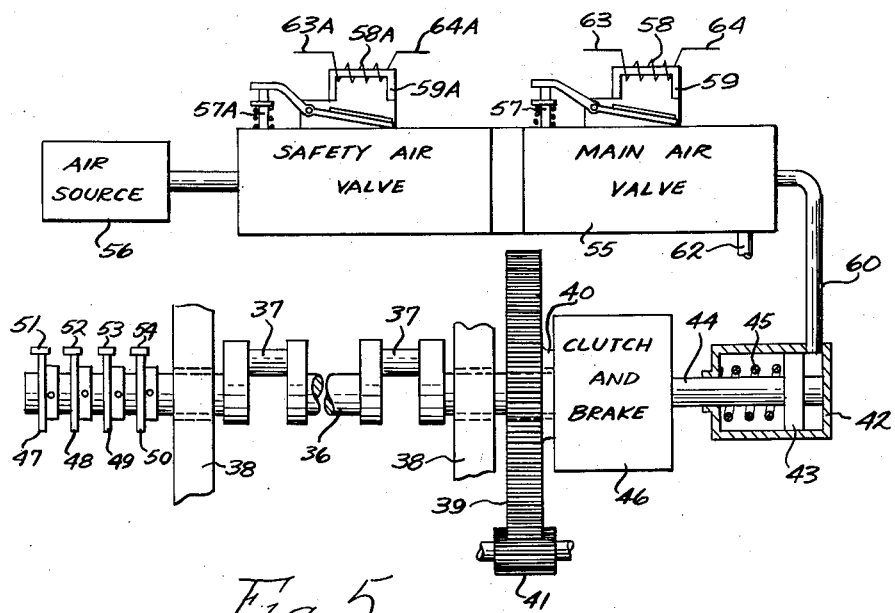
Fig. 5 is a view similar to Fig. 2 of part of a power press comprising a dual air valve and two electromagnetic windings.

To simplify the description of Fig. 5, it is made to correspond to Fig. 2, and shows the air source 56, air conduit 60, exhaust conduit 62, air cylinder 42, piston 43, piston rod 44, and the clutch and brake mechanism 46 all as in Fig. 2.

A valve housing 55 contains a "main air valve," controlled by a first pilot valve 57; and the pilot valve is controlled by a magnet 59 having a first winding 58 and an energizing circuit 63, 64. These parts have the same reference numerals as in Fig. 2.

The valve housing 55 also contains a "safety air valve" controlled by a second pilot valve 57A and a second magnet 59A having a second winding 58A and energizing circuit 63A—64A. The two air valves are in series between the source of air pressure 56 and the cylinder 42.

As described in the Hoge patent application, both windings 58 and 58A must be energized concurrently and operate their pilot valves by their magnets, to cause air to go through the two air valves 56 to start the press; and both must be maintained energized to keep the press going through its complete cycle.

Upon de-energizing either winding 58 or 58A, the cylinder 42 exhausts at conduits 60—62 and stops the press.

If either winding 58 or 58A fails to operate its pilot valve or perform any of its functions, the cylinder 42 will exhaust and stop the press.

As more completely described in the said Hoge application advantages of safety result from this arrangement.

In the said Hoge application the two windings are described as connected in parallel across a source of current, and as energized and de-energized by a single control contactor.

In applying the present invention to press controls, in which operative safety principles such as those of said Hoge application are embodied, and depend upon the utilization of two simultaneously or concurrently energized and de-energized windings, and particularly when the current to the windings is controlled by transistors, it has been found to be more advantageous to provide separate energizing circuits and separate current sources for the two windings than to energize the windings in parallel from the same current source, as indicated in the said Hoge patent application.

Figure 6:
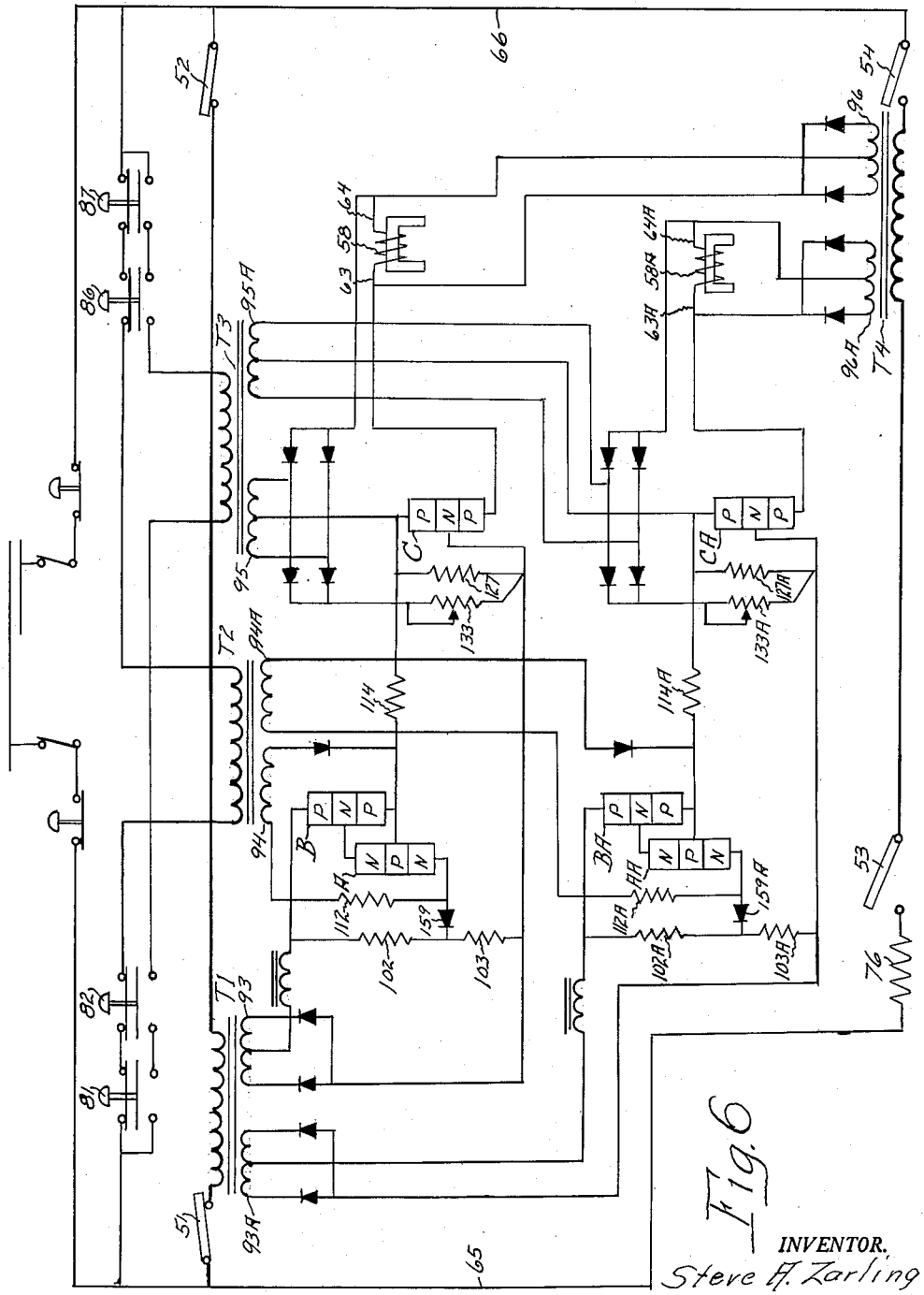
Fig. 6 is a view similar to Fig. 3 illustrating the application of the invention to the control of a press of the type indicated in Fig. 5.

In Fig. 6 is illustrated such a press control system; the two windings 58 and 58A and their energizing circuits 62—64 and 63A—64A are reproduced from Fig. 5 with the same reference numerals.

By comparing Fig. 6 with Fig. 3 the description of Fig. 6 can be simplified.

Fig. 6 and Fig. 3 both have the same set of operators push button contactors 81—82—86—87 with normally closed up contacts 79—80—84—85 controlling energization of transformer T2; and normally open down contacts 88—89—91—92 controlling energization of transformer T3.

Both Figs. 6 and 3 have the same cam switches 51—52 controlling energization of transformer T1; and the same cam switches 53—54 controlling energization of transformer T4.

In Fig. 6, the valve winding 58 is controlled by a first transistor system comprising transistors A—B—C energized from the secondaries 93, 94, 95 and 96 respectively of transformers T1, T2, T3 and T4; and this system is like that of Fig. 3 as indicated by the same reference numerals as in Fig. 3.

In Fig. 6 the valve winding 58A is controlled by another or second transistor system, comprising transistors AA, BA, CA, which may be, and is illustrated as, like the first system; as indicated by the same reference numerals as the first system but with the suffix A.

When, as here contemplated, operation of the press control as a whole depends upon two windings 58 and 58A, and their energizing current comes to them through transistors, reliability of operation demands that the current in the biasing and main circuits of the transistors and in the said windings shall be of fixed values once they are predetermined, or at the worst shall have only a small range of variation.

It has been found that this can be effected with certainty only when the two windings and their transistor systems are isolated from each other electrically; and this has been done in Fig. 6; by energizing the second system from a second set of secondaries 93A, 94A, 95A, and 96A provided on the transformers T1, T2, T3, and T4.

Also, when a transistor is used in a press control system of this type, there is the possibility that, due to some cause, the transistor may break down and pass current through its main circuit, out of control by its biasing circuit.

In a press control system having two concurrently energized windings as described in the said Hoge application, and as shown at 58—59A, Fig. 6, if the windings were energized in parallel by a common single system through a single transistor, such as C, and the transistor should break down, then both windings would be energized concurrently through the broken down transistor, and continue to be so energized so long as the push buttons were held down, and result in dangerous repeat operation of the press. By energizing the windings 58 and 58A as in Fig. 6, each from its own electrically isolated system, and through its own transistor C and CA, breaking down of either transistor will leave the other still under control by its system and when the winding of one system becomes de-energized by normal operation of its system, the press will be stopped for want of the concurrent energization of both windings, necessary to keep the press running, as described.

Further insurance against unsafe repeat operation thus results from the two system arrangement of Fig. 6. The probability that this safety provision would fail by breaking down of both transistors at the same time is so remote as to be negligible.

In Fig. 3 and in Fig. 6 at 159 is a rectifier provided to protect the transistor A from the flow of current therein in the direction opposite to that described, which possibly in some instances might occur; and at 159A in Fig. 6 is a like protecting rectifier for the transistor AA.

The apparatus described herein, has been found to function satisfactorily as described when transistors A and E having the commercial designation 2N95; and transistors B, C and D, having the commercial designation 2N68, are used; and when certain other elements have the following quantitative values:

Transformer secondaries, 94—95—96 each with output voltage 40 volts.
Transformer secondary 93 with output voltage 12.6 volts.
Winding 58 with resistance of 20 ohms.
Resistor 102—220 ohms.
Resistor 103—220 ohms.
Resistor 112—33,000 ohms.
Resistor 114—22 ohms.
Resistor 127—680 ohms.
Resistor 133—6800 ohms.

I claim:

1. In a control for a cyclically operating machine; an operator's contactor normally restored and having normally closed first control contacts and normally open second control contacts and operable to open the first contacts and close the second contacts; a first mechanical contactor normally closed at the beginning of the machine cycle and operated by the machine to open and close again near the end of the cycle; a work transistor; work transistor control means to render it conducting and non-conducting, comprising a first and a second control transistor; the first control transistor having a biasing circuit connected to be effective, when the first control contacts are closed, to render its main circuit conducting; the main circuit of the first control transistor connected to be effective, when the first mechanical contactor is closed, to energize the biasing circuit of the second control transistor; the main circuit of the second control transistor connected to be made effective by the closed first mechanical contactor before it opens, to energize the biasing circuit of the first control transistor and the biasing circuit of the work transistor to maintain the first control transistor conducting and to render the work transistor conducting; an electromagnetic winding responsive to the energization and de-energization of which the machine starts and stops its cycle; a work circuit connected to be effective, upon closing the second control contacts, to energize the winding through the main circuit of the work transistor; a second mechanical contactor normally open at the beginning and end of the cycle and operated by the machine to close at an intermediate point of the cycle, and connected to be effective upon closing to energize the winding concurrently with its energization by the work circuit; opening of the first mechanical switch terminating energization of the biasing circuits of the second control transistor and of the work transistor and rendering the latter non-conducting, whereby the winding is maintained energized by the second mechanical switch; and reclosing of the first mechanical switch being ineffective to restore said terminated energization until and unless the first control contacts are closed at least momentarily to effect energization of the biasing circuit of the first control transistor.

2. In a control for a cyclically operating machine; an operator's contactor normally restored and having normally closed first control contacts and normally open second control contacts and operable to open the first contacts and close the second contacts; a first mechanical contactor normally closed at the beginning of the machine cycle and operated by the machine to open and close again near the end of the cycle; a work transistor; work transistor control means to render it conducting and non-conducting, comprising a control transistor connected to be initially rendered conducting and maintained conducting only by closing the first control contacts when the first mechanical contactor is closed, and to be rendered non-conducting by opening of the first mechanical contactor; a circuit through the conducting control transistor connected to be made effective by the closed first mechanical switch before it opens, to render the work transistor conducting; an electromagnetic winding responsive to the energization and de-energization of which the machine starts and stops its cycle; a work circuit connected to be effective, upon closing the second control contacts, to energize the winding through the main circuit of the work transistor; a second mechanical contactor normally open at the beginning and end of the cycle and operated by the machine to close at an intermediate point of the cycle, and connected to be effective upon closing to energize the winding concurrently with its energization by the work circuit; whereby, opening of the first mechanical contactor renders the work transistor non-conducting and the winding is then maintained energized by the second mechanical switch; and reclosing of the first mechanical switch is ineffective to restore conductivity of the work transistor until and unless the control transistor is first rendered conducting by closing of the first control contacts.

3. In an electric control for a cyclically operating machine; an operator's contactor comprising normally closed and normally open contacts and operable to open the closed contacts and close the open contacts; a first mechanical switch open at the beginning and end of the machine cycle and timed to close at an intermediate point of the cycle; a second mechanical switch normally closed and timed to open and then close again near the end of the cycle; a pair of electromagnetic work devices having respective windings; means responding only to the concurrent energization of both windings to cause starting of the machine cycle, and to the energization of only one to prevent starting, and to the de-energization of either one or both to stop the cycle; a pair of control systems each comprising a first transformer secondary and rectifiers for supplying unidirectional current to the respective windings through the main circuits of respective work transistors; each system comprising a second transformer secondary and respective circuit means energizable thereby to initiate conductivity of respective control transistor means; each system comprising a third transformer secondary and rectifiers for supplying unidirectional current to maintain conductivity of said control transistor means and to supply current through respective main circuits of said control transistor means to energize the biasing circuits of the respective work transistors; each system comprising a fourth transformer secondary and rectifiers for supplying unidirectional current to the respective windings concurrently with the supply thereto from the first secondaries; the first transformer secondaries energized by a common primary connected to be energized in series with the normally open contacts of the operator's contactor; the second transformer secondaries energized by a common primary connected to be energized in series with the normally closed contacts of the operator's contactor; the third transformer secondaries energized by a common primary connected to be energized through the second mechanical switch; the fourth transformer secondaries energized by a common primary connected to be energized through the first mechanical switch.

4. In an electric control for a cyclically operating machine; an operator's contactor comprising normally closed and normally open contacts and operable to open the closed contacts and close the open contacts; a first mechanical switch open at the beginning and end of the machine cycle and timed to close at an intermediate point of the cycle; a second mechanical switch normally closed and timed to open and then close again near the end of the cycle; a pair of electromagnetic work devices having respective windings; means responding only to the concurrent energization of both windings to cause starting of the machine cycle, and to the energization of only one to prevent starting, and to the de-energization of either one or both to stop the cycle; a first transformer primary connected to be energized through the normally open contacts of the operator's contactor, when closed; a second transformer primary connected to be energized through the normally closed contacts of the operator's contactor; a third transformer primary connected to be energized through the second mechanical switch; a fourth transformer primary connected to be energized through the first mechanical switch; a pair of control systems electrically isolated from each other, and each control system comprising a work circuit, both work circuits energizable from the first primary and each including a work transistor and one of the said windings; each control system comprising an initiating circuit, both initiating circuits energizable from the second primary and each including control transistor means and means to initiate conductivity of the contral transistor means; each control system comprising a maintaining circuit and both maintaining circuits energizable from the third primary and each including means to maintain conductivity of the control transistor means of one of the initiating circuits and including means to initiate conductivity of the work transsstor of one of the work circuits; each control system comprising a holding circuit, both holding circuits energizable from the fourth primary and each including one of said windings.

5. In an electric control for a cyclically operating machine; an operator's contactor comprising normally closed and normally open contacts and operable to open the closed contacts and close the open contacts; a first mechanical switch open at the beginning and end of the machine cycle and timed to close at an intermediate point of the cycle; a second mechanical switch normally closed and timed to open and then close again near the end of the cycle; a pair of electromagnetic work devices having respective windings; means responding only to the concurrent energization of both windings to cause starting of the machine cycle, and to the energization of only one to prevent starting, and to the de-energization of either one or both to interrupt the cycle; a pair of control systems for the respective work device windings; each control system includnig a first net work comprising current conducting means adapted to be conditioned to conduct current and then effective upon energization of the net work to pass current to a respective one of the windings to energize it; each control system including a second net work comprising means to condition the current conducting means of a corresponding one of the first net works when the second net works are energized; both of said first net works being energizable through the normally open contacts when closed; both said second net works being energizable through the normally closed contacts; each system including a third net work comprising means to maintain conditioning of the conditioned current conducting means when the third net works are energized and after opening of the normally closed contacts; and both of said third net works being energizable through the second mechanical switch when closed; each system including a fourth net work comprising means to energize one of the respective windings concurrently with energization thereof by the first net work, and both of said fourth net works being energizable through the first mechanical switch.

6. In an electric control for a cyclically operating machine; an operator's contactor comprising normally closed and normally open contacts and operable to open the closed contacts and close the open contacts; a first mechanical switch open at the beginning and end of the machine cycle and timed to close at an intermediate point of the cycle; a second mechanical switch normally closed and timed to open and then close again near the end of the cycle; an electromagnetic device comprising a winding; means responding to energization and de-energization of the winding to start and stop the machine, respectively; a control system including a first net work comprising a transistor, a work circuit containing the main circuit of the transistor, and the said winding, and energizable through the said normally open contacts through closed to energize the winding when the transistor when it is in conducting condition; the system including a second net work energizable through the normally closed contacts for initiating energization of a biasing circuit of the transistor to render it conducting; the system including a third net work energizable through the second mechanical switch and maintaining energization of the transistor biasing circuit, to maintain it conducting after opening of the normally closed contacts; the system including a fourth net work energizable through the first mechanical switch for energizing the winding concurrently with its energization by the first net work.

7. In a control system, an operator's control contactor having normally closed first control contacts and normally open second control contacts and operable to both open the closed contacts and close the open contacts; an electric work device and the main circuit of a work transistor in series in a work circuit; the work transistor having a biasing circuit; the work circuit energized from a source of current through the second control contacts when closed and when the work transistor is in conducting condition; control means for rendering the work transistor conducting comprising a control transistor having a main circuit supplying current to the biasing circuit of the work transistor; the control transistor having a biasing circuit; circuit means energizing the biasing circuit of the control transistor through the first control contacts when closed to render the control transistor initially conducting; a switch comprising normally closed third control contacts; a maintaining circuit energizing the biasing circuit of the control transistor through the third control contacts when closed to maintain the control transistor conducting; whereby the work device will be energized through the work transistor upon closing the second control contacts and will be de-energized upon opening of the third control contacts and maintained de-energized upon reclosing of the third control contacts unless and until the first control contacts are closed.

8. In a control system, a source of current therefor; a work transistor having a main path and a biasing path; control means controlling energization of the biasing path of the work transistor to render its main path alternately conducting and non-conducting; said control means comprising a control transistor having a main path and a biasing path; first and second control contacts; a first control circuit connected to the source comprising the first control contacts and the biasing path of the control transistor; a second control circuit connected to the source comprising the second control contacts and comprising means causing current to flow in the first control circuit and in the biasing path of the control transistor upon closing of the second control contacts, whereby when both the first and second control contacts are closed, the control transistor is rendered conducting and is maintained conducting by current through the first control contacts after opening of the second control contacts; a work device connected to be energized from the source through the main path of the work transistor and third control contacts; the biasing path of the work transistor being connected to be energized by current through the main path of the control transistor whereby it will be de-energized by opening the first control contacts and not re-energized again upon their closing until or unless the second control contacts are also closed at least momentarily; fourth control contacts connected for energizing the work device from the source concurrently with energization effected by the third control contact and whereby the work device may be maintained energized through the fourth control contacts after opening of the third control contacts and until opening of the fourth control contacts.

9. In a control system, a source of current therefor; a work device connected to be energized by current from the source comprising; a work transistor having a main and a biasing path; a control transistor having a main and a biasing path; first, second, third and fourth control contacts; the first and fourth control contacts are connected to be opened and closed during a mechanism cycle, said mechanism operating in response to energization of the work device; the second and third control contacts to be opened and closed by an operator; a first control circuit connected to the source and comprising the first control contacts and the biasing path of the control transistor; a second control circuit connected to the source and comprising the second control contacts and means causing current to flow in the first control circuit and the biasing path of the control transistor upon closing of the second control contacts, whereby when both the first and second control contacts are closed, the control transistor is rendered conducting and is maintained conducting by current through the first control contacts after opening of the second control contacts; the work device connected to be energized from the source through the third control contacts and the main path of the work transistor; the main path of the work transistor rendered alternately conducting and non-conducting by energization and de-energization of its biasing path, the biasing path connected to be energized by current through the main path of the control transistor whereby it will be de-energized by opening of the first control contacts; the fourth contacts connected to energize the work device from the source concurrently with energization effected by the third control contacts; whereby the work transistor is rendered conducting by closing of the second control contacts by the operator, and the work device is energized through the main path of the work transistor by closing of the third control contacts by the operator and start operation of the mechanism; and in which, in sequence, the fourth control contacts are timed to be closed by the mechanism to maintain energization of the work device, and the first control contacts are timed to be opened and again closed by the mechanism and render the work transistor non-conducting so the work device is maintained energized solely through the fourth control contact, and the fourth control contacts are timed to be opened by the mechanism to de-energize the work device and stop operation of the mechanism and the work device cannot again be energized to operate the mechanism except after the closing of the second control contacts by the operator.

References Cited in the file of this patent

UNITED STATES PATENTS

| | | |
|---|---|---|
| 1,709,360 | Mayer | Apr. 16, 1929 |
| 2,301,491 | Yanchenko | Nov. 10, 1942 |
| 2,541,322 | Barney | Feb. 13, 1951 |
| 2,655,609 | Shockley | Oct. 13, 1953 |
| 2,663,800 | Herzog | Dec. 22, 1953 |
| 2,663,830 | Oliver | Dec. 22, 1953 |
| 2,744,198 | Raisbeck | May 1, 1956 |
| 2,762,873 | Goodrich | Sept. 11, 1956 |
| 2,788,449 | Bright | Apr. 9, 1957 |
| 2,831,126 | Linvill et al. | Apr. 15, 1958 |

FOREIGN PATENTS

| | | |
|---|---|---|
| 1,080,849 | France | June 2, 1954 |